United States Patent [19]

Tanahashi

[11] Patent Number: 4,745,991
[45] Date of Patent: May 24, 1988

[54] SPEED CONTROL APPARATUS FOR A.C. ELEVATOR

[75] Inventor: Tooru Tanahashi, Inazawa, Japan

[73] Assignee: Mitsubishi Denki Kabushiki Kaisha, Japan

[21] Appl. No.: 32,539

[22] Filed: Apr. 1, 1987

[30] Foreign Application Priority Data

Apr. 3, 1986 [JP] Japan .................. 61-77069

[51] Int. Cl.⁴ ............................ B66B 1/30; H02P 5/40
[52] U.S. Cl. ...................... 187/119; 318/801
[58] Field of Search ........... 187/119; 318/799–802, 318/807–811

[56] References Cited

U.S. PATENT DOCUMENTS

| | | | |
|---|---|---|---|
| 4,230,979 | 10/1980 | Espelage et al. | 318/801 X |
| 4,456,868 | 6/1984 | Yamamura et al. | 318/800 |
| 4,459,534 | 7/1984 | Nagase et al. | 318/808 |
| 4,503,375 | 3/1985 | Okuyama | 318/808 X |
| 4,625,834 | 12/1986 | Tanahashi | 187/119 |
| 4,671,389 | 6/1987 | Tanahashi | 187/119 |
| 4,677,361 | 6/1987 | Yonemoto | 187/119 X |
| 4,681,191 | 7/1987 | Ikejima | 187/119 |

Primary Examiner—William M. Shoop, Jr.
Assistant Examiner—W. E. Duncanson, Jr.
Attorney, Agent, or Firm—Leydig, Voit & Mayer

[57] ABSTRACT

A speed control apparatus for an A.C. elevator according to this invention comprises integration circuits which integrate outputs of current detectors for detecting primary currents of an induction motor and which are reset at fixed periods, and holding circuits which hold outputs of the integration circuits for a predetermined time. Thus, the influences of the ripples of the currents by pulse width modulation are eliminated, and the digital conversions of the three-phase currents can be performed by a single analog-to-digital converter.

11 Claims, 4 Drawing Sheets

SPEED CONTROL APPARATUS FOR A.C. ELEVATOR

BACKGROUND OF THE INVENTION

This invention relates to an apparatus for controlling the speed of an elevator which is driven by an induction motor.

FIG. 4 is an arrangement diagram which shows a prior-art speed control apparatus for an A.C. elevator disclosed in the official gazette of Japanese patent application No. 130511/1984 by way of example.

Referring to the figure, numeral 1 designates a three-phase A.C. power source. A converter 2 connected to the A.C. power source 1 is controlled so as to generate a D.C. output voltage corresponding to an angular velocity ω. A smoothing capacitor 3 smooths the output of the converter 2, and a voltage detector 4 made of a resistor is connected across both the terminals of the smoothing capacitor 3. Numeral 5 indicates a PWM inverter which is connected across both the terminals of the smoothing capacitor 3, which is constructed of transistors and diodes, and which generates A.C. outputs 5a–5c of variable voltage and variable frequency in accordance with the pulse width modulation (PWM) system. Numeral 6 indicates a three-phase induction motor for hoisting, which is driven by the outputs of the inverter 5. A speed detector 7 such as tachometer generator is directly coupled to the motor 6, and generates a speed signal 7a proportional to the rotational speed of the motor 6. A driving sheave 8 for a hoist is driven by the motor 6, and a main rope 9 is wound round the sheave 8. The cage 10 of the elevator is coupled to one end of the main rope 9, while a counterweight 11 is coupled to the other end of the main rope 9. Current detectors 12–14 made of current transformers generate current feedback signals 12a–14a corresponding to the primary currents of the phases of the motor 6, respectively. Numeral 15 denotes a coordinate transformation circuit A made of a three-phase/two-phase transformation circuit which receives a sine wave signal 21a and a cosine wave signal 21b to be described later, and which converts the current feedback signals 12a–14a into an exciting current component signal 15a and a torque current component signal 15b on coordinate axes that rotate in synchronism with the angular velocity ω of the secondary magnetic flux vector of the motor 6. Shown at numeral 16 is a divider. A coefficient multiplication circuit 17 multiplies its input by a coefficient and thus provides a slip frequency signal 17a. A non-inverting amplifier 18 has a gain p (corresponding to the number of pole pairs of the motor 6), and receives the speed signal 7a. An adder 19 addes the slip frequency signal 17a and the output of the non-inverting amplifier 18 and thus provides a synchronizing angular velocity signal 19a. An integrator 20 integrates the synchronizing angular velocity signal 19a provides the phase angle signal 20a of the secondary flux vector. A function generator 21 receives the phase angle signal 20a, and delivers the sine wave signal 21a and cosine wave signal 21b corresponding thereto. A subtracter 22 subtracts the exciting current component signal 15a from an exciting current component command value 23 and thus provides the resulting deviation signal. An exciting current component control circuit 24 is constructed of lag/lead circuits, and controls the output of the subtracter 22 so as to become zero. Symbol 24a denotes an exciting voltage component command value. A subtracter 25 subtracts the speed signal 7a from a speed command value 26 and thus provides the resulting deviation signal. A speed control circuit 27 is constructed of lag/lead circuits, and controls the output of the subtracter 25 so as to become zero. Symbol 27a denotes a torque current component command value, and a subtracter 28 subtracts the torque current component signal 15b from the torque current component command value 27a and thus provides the resulting deviation signal. A torque current component control circuit 29 is constructed of lag/lead circuits, and controls the output of the subtracter 28 so as to become zero. Symbol 29a denotes a torque voltage component command value. Numeral 30 indicates a coordinate transformation circuit B made of a two-phase/three-phase transformation circuit which receives the sine wave signal 21a and the cosine wave signal 21b and which converts the exciting voltage component command value 24a and the torque voltage component command value 29a into the primary voltage command values 30a–30c of the three respective phases.

The prior-art speed control apparatus for the A.C. elevator is constructed as stated above, and the operation thereof will now be explained.

The principle of the vector control consists in that the primary current to be fed to an induction motor is grasped as a vector quantity on coordinate axes (d–q axes) which rotate in synchronism with the secondary magnetic flux vector, and that the primary current vector is decomposed into a component parallel to the secondary flux vector (namely, an exciting current component) and a component orthogonal thereto (namely, a torque current component), which are controlled independently of each other, whereby the non-interfering controls of the secondary magnetic flux and torque of the induction motor are performed. Supposing a case where the excitation of the induction motor is controlled to be constant, that is, a case where the d-axial component $i_{ds}$ of the primary current vector is $i_{ds}=I_{ds}$ (a constant value), the above purpose is achieved by controlling the d-axial component $i_{dr}$ of the secondary current vector so as to become zero. More specifically, under the conditions:

$$i_{ds}=I_{ds} \text{ (constant)} \tag{1}$$

$$i_{dr}=0 \tag{2}$$

the equation (3) of the state of the induction motor and the equation (4) of the developed torque thereof are respectively linearized as follows:

$$p\begin{bmatrix} i_{qs} \\ i_{qr} \end{bmatrix} = \begin{bmatrix} \dfrac{R_s}{\sigma L_s} & \dfrac{R_r M}{\pi L_s L_r} \\ \dfrac{R_s M}{\sigma L_s L_r} & -\dfrac{R_r}{\sigma L_r} \end{bmatrix} \begin{bmatrix} i_{qs} \\ i_{qr} \end{bmatrix} + \begin{bmatrix} -I_{ds} & -I_{ds}\dfrac{pM^2}{\sigma L_s L_r} & \dfrac{1}{\sigma L_s} \\ 0 & I_{ds}\dfrac{pM}{\sigma L_r} & -\dfrac{M}{\sigma L_s L_r} \end{bmatrix} \begin{bmatrix} \omega \\ \omega_r \\ V_{qs} \end{bmatrix} \tag{3}$$

$$T_e = -pMI_{ds}i_{qr} = p\dfrac{M^2}{L_r}I_{ds}i_{qs} \tag{4}$$

Here,

P=d/dt: differential operator, $i_{qs}$: q-axial component of the primary current of the induction motor, $i_{qr}$: q-axial component of the secondary current of the same, $R_s$: primary resistance of the induction motor, $R_r$: secondary resistance of the same, $L_s$: primary inductance of the same, $L_r$: secondary inductance of the same, M: mutual inductance between the primary winding and secondary winding of the induction motor, p: number of pole pairs of the induction motor, ω: angular velocity of the secondary magnetic flux vector of the same, $ω_r$: actual angular velocity of the rotor of the same, $V_{qs}$: q-axial component of the primary voltage of the same, $T_e$: developed torque of the induction motor, σ: leakage coefficient.

$$\sigma = 1 - \frac{M^2}{L_s L_r}$$

On this occasion, the d-axial component $λ_{dr}$ and q-axial component $λ_{qr}$ of the secondary magnetic flux become $λ_{dr}+MI_{ds}$ and $λ_{qr}=0$, respectively, and the secondary magnetic flux becomes a vector which rotates in synchronism with the d-axis.

Meanwhile, the conditions of Eqs. (1) and (2) are satisfied in such a way that, using the primary current components $i_{ds}$, $i_{qs}$ and rotor velocity $ω_r$ of the induction motor as controlled variables, the angular velocity ω of the secondary magnetic flux vector and the d-axial component $V_{ds}$ of the primary voltage are respectively controlled in accordance with Eqs. (5) and (6):

$$\omega = p\omega_r + \frac{R_r}{L_r} \frac{i_{qs}}{i_{qs}} = p\omega_r + p\omega_s \quad (5)$$

$$V_{ds} = R_s I_{ds}^* - \omega\sigma L_s I_{qs} + K(I_{ds}^* - i_{ds}) \quad (6)$$

Here, $pω_s$ in Eq. (5) denotes a slip frequency, and $I_{ds}^*$ in Eq. (6) denotes an exciting current command value (a constant value).

Next, the concrete operation of the above vector control will be described with reference to FIG. 4. This example corresponds to the case where, using the PWM inverter 5, the excitation of the induction motor 6 is controlled to be constant. However, the first term and second term of the right-hand side of Eq. (6) are omitted assuming the gain K of the third term to be sufficiently large.

The exciting current component command value $I_{ds}^*$ indicated at numeral 23 is input to the subtracter 22 and is compared therein with the exciting current component signal $i_{ds}$ at symbol 15a provided from the coordinate transformation circuit A at numeral 15, namely, with the exciting component of the current having actually flowed to the motor 6, and the resulting deviation is output from the subtracter 22. This deviation is passed through the exciting current control circuit 24 to become the exciting voltage component command value $V_{ds}^*$ indicated at symbol 24a, which is input to the coordinate transformation circuit B at numeral 30.

The speed command value $ω_r^*$ indicated at numeral 26 is input to the subtracter 25 and is compared with the speed signal $ω_r$ at symbol 7a sent from the speed detector 7, and the resulting deviation is output from the subtracter 25. This deviation is passed through the speed control circuit 27 to become the torque current component command value $i_{qs}^*$ at symbol 27a, which is input to the subtracter 28. Here, it is compared with the torque current component signal $i_{qs}$ at symbol 15b provided from the coordinate transformation circuit A at numeral 15. The resulting deviation is output and is passed through the torque current component control circuit 29 to become the torque voltage component command value $V_{qs}^*$ at symbol 29a, which is input to the coordinate transformation circuit B at numeral 30.

On the other hand, the divider 16 and the coefficient multiplication circuit 17 produce the slip frequency signal $pω_s$ indicated at symbol 17a in accordance with the second term of Eq. (5), and this signal is added in the adder 19 with the electrical angular frequency $pω_r$ of the induction motor 6 obtained by multiplying the speed signal $ω_r$ at symbol 7a by the number of pole pairs p, whereby the synchronizing angular velocity signal 19a of the secondary magnetic flux vector is output. This output is integrated by the integrator 20 into the phase angle signal θ of the secondary flux vector indicated at symbol 20a. The sine wave signal 21a and the cosine wave signal 21b corresponding to the phase angle are extracted from the function generator 21, and are input to the coordinate transformation circuit B at numeral 30.

The coordinate transformation circuit B indicated at numeral 30 converts the inputs 24a, 29a, 21a and 21b so as to deliver the primary voltage command values 30a-30c, which actuate the base driving circuits of the PWM inverter 5, whereby the well-known PWM control is performed. Thereafter, the A.C. outputs 5a-5c from the inverter 5 are detected by the current transformers 12-14, and the current feedback signals 12a-14a are sent to the coordinate transformation circuit A indicated at numeral 15.

In this manner, the negative feedback control loops independent of each other are respectively comprised for the exciting current component signal $i_{ds}$ at symbol 15a and the torque current component signal $i_{qs}$ at symbol 15b of the primary current which is a D.C. quantity; when the exciting current component command value $i_{ds}^*$ at numeral 23 as predetermined and the torque current component command value $i_{qs}^*$ at symbol 27a corresponding to the deviation between the speed command value $ω_r^*$ at numeral 26 and the speed signal $ω_r$ at symbol 7a are given, a gain compensation and a phase compensation appropriate for the current deviations are respectively performed by the individual current control loops; and using the generated exciting voltage component command value $V_{ds}^*$ at symbol 24a and torque voltage component command value $V_{qs}^*$ at symbol 29a as manipulated variables, the primary current vector of the motor 6 is controlled so as to agree with the primary current reference vector; whereby a high-precision speed control of excellent responsiveness is permitted. Moreover, the slip frequency signal $pω_s$ indicated at symbol 17a is calculatively found using the primary current feedback signals of the motor 6, and the instantaneous values of the primary voltages of the motor 6 are given according to the calculated signal, thereby permitting a high-precision vector control which satisfies a performance equal to that of a D.C. machine also transiently. Accordingly, a favorable control performance can be realized also in the control of an elevator in which importance is attached to transient response.

The vector control calculations in FIG. 4 are usually executed using a microcomputer. In this case, the current feedback signals 12a-14a are accepted through analog-to-digital (hereinbelow, abbreviated to "A/D") converters.

In the prior-art speed control apparatus for the A.C. elevator as thus far described, each of the current feedback signals 12a-14a contains a ripple component as shown in FIG. 3(a) on account of the PWM. This leads to the problem that the value of the current feedback signal becomes different depending upon the conversion timing of the A/D converter. Ordinarily, since an A/D converter is expensive, an expedient is often employed in which analog switches are disposed before and behind the A/D converter, whereby a plurality of analog inputs are converted into digital values by the single A/D converter. In the case of FIG. 4, however, when the current feedback signals 12a-14a are sequentially converted into the digital values by the single A/D converter, the phases of the currents differ depending upon the conversion times of the A/D converter, and the induction motor 6 cannot be controlled as the foregoing theory. This leads to the problem that the A/D converters needs must be disposed for the respecive phases so as to perform the digital conversions at an identical timing.

SUMMARY OF THE INVENTION

This invention has been made in order to solve the problems stated above, and has for its object to provide a speed control apparatus for an A.C. elevator which eliminates the influences of the ripples of currents by the PWM, thereby making it possible to perform the digital conversions of the three-phase currents with a single A/D converter.

The speed control apparatus for an A.C. elevator according to this invention comprises integration circuits which integrate outputs of current detectors for detecting primary currents of an induction motor and which are reset at a fixed period, and holding circuits which hold outputs of the integration circuits for a predetermined time.

In this invention, ripple components contained in the outputs of the current detectors are eliminated by the integration circuits, and the current values of respective phases at an identical point of time are held by the holding circuits.

BRIEF DESCRIPTION OF THE DRAWINGS

Throughout the drawings, the same symbols indicate identical portions.

DESCRIPTION OF THE PREFERRED EMBODIMENT

Figure 1:
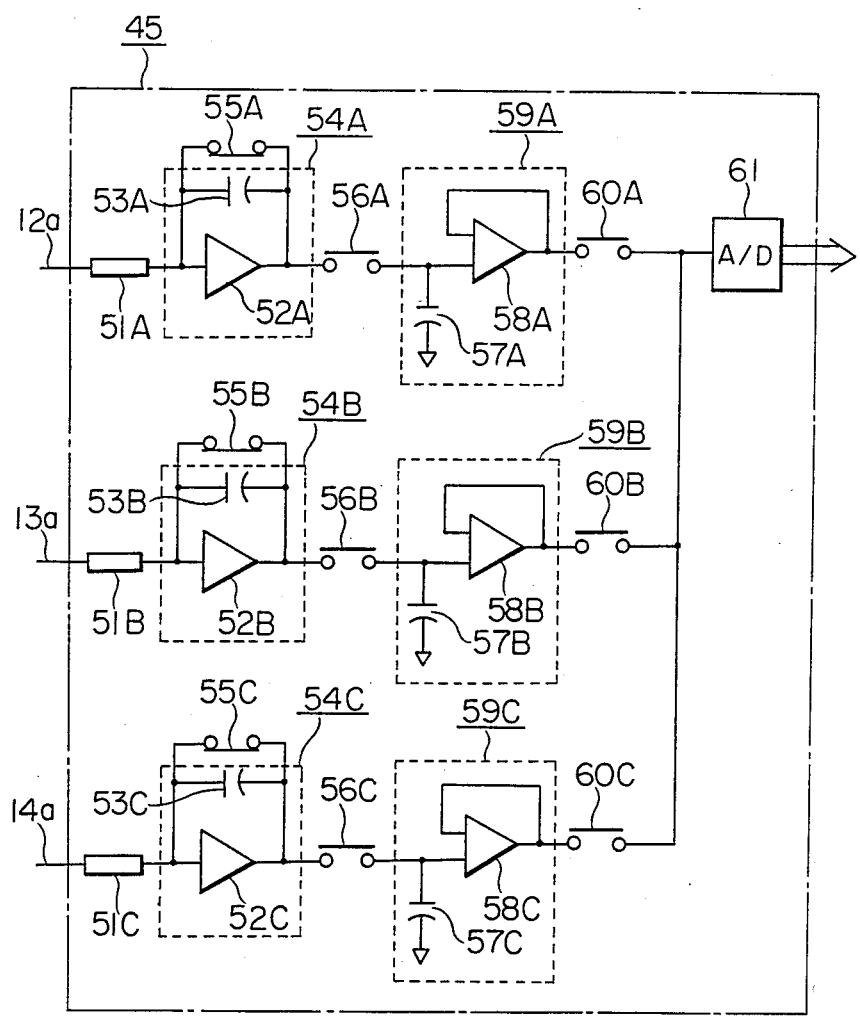
FIG. 1 is a block circuit diagram of an input circuit (45) in FIG. 2.
Figure 2:
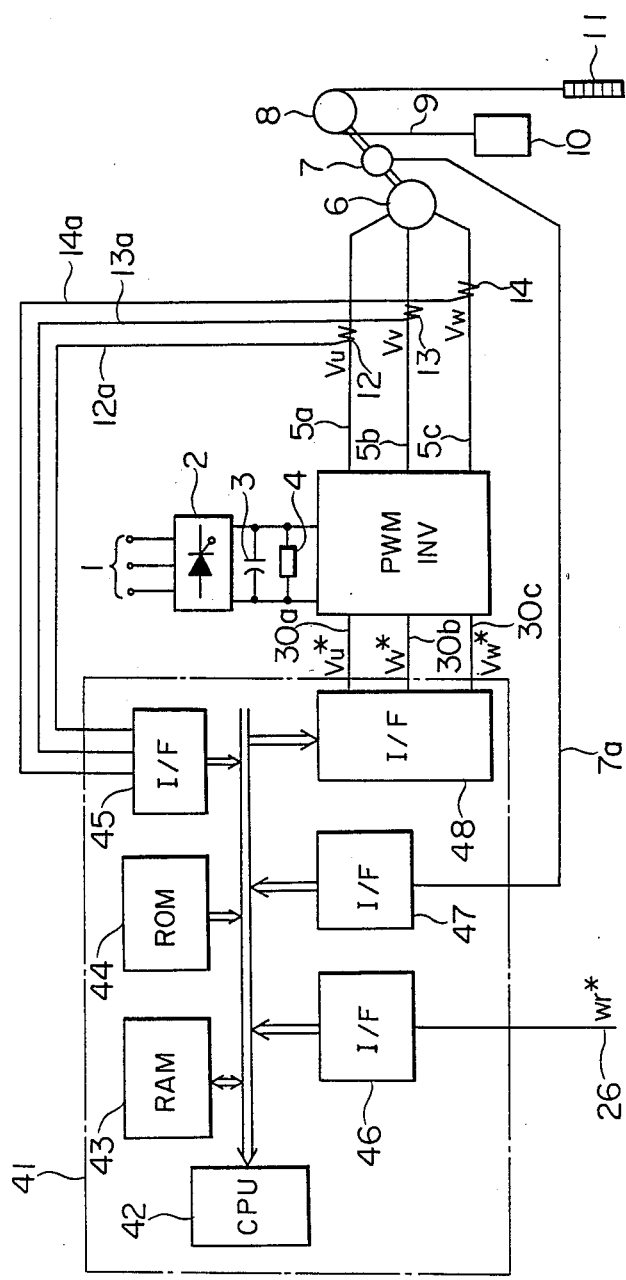
FIG. 2 is general arrangement diagram of a speed control apparatus for an A.C. elevator embodying this invention.
Figure 3:
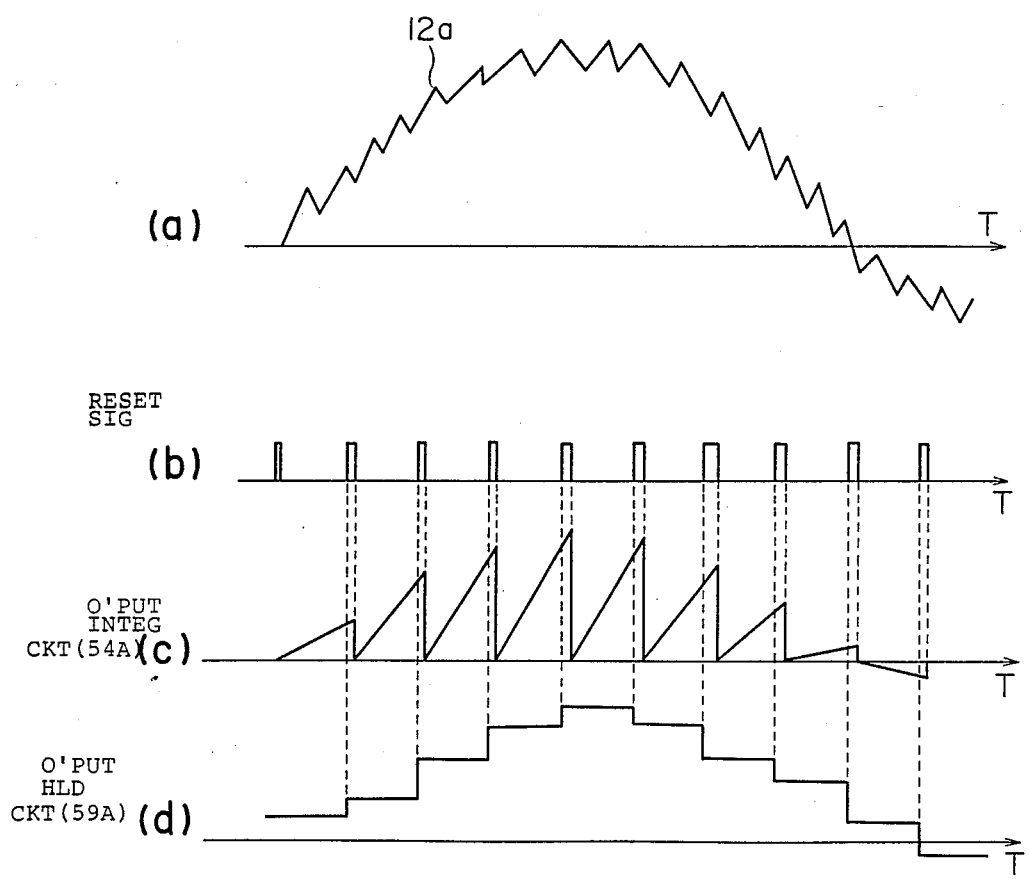
FIGS. 3(a)-3(d) are diagrams showing the waveforms of several parts in the embodiment.

FIG. 1-FIG. 3(d) are diagrams illustrative of an embodiment of this invention, in which FIG. 1 is a circuit diagram of an input circuit (45), FIG. 2 is a general arrangement diagram of the embodiment, and FIGS. 3(a)-3(d) are diagrams of waveforms at several parts. In these figures, portions or signals 1-5, 5a-5c, 6, 7, 7a, 8-14, 12a-14a, 26, and 30a-30c are the same as in the prior-art apparatus stated before.

Referring to the figures, numeral 41 designates a microcomputer, which includes a CPU 42, a RAM 43, a ROM 44, an input circuit 45 for converting the current feedback signals 12a-14a into digital values, an input circuit 46 for converting the speed command value 26, an input circuit 47 for converting the speed signal 7a, and an output circuit 48 for delivering the primary voltage command values 30a-30c to the PWM inverter 5. Symbols 51A-51C denote resistors. Operational amplifiers 52A-52C and capacitors 53A-53C constitute integration circuits 54A-54C, respectively. Contacts 55A-55C are closed at the falling edge of each of reset signals illustrated in FIG. 3(b) (pulse signals generated every predetermined time interval) and are opened after a fixed period of time, while contacts 56A-56C are closed at the rising edge of the reset signal and are opened after a fixed period of time. Capacitors 57A-57C and operational amplifiers 58A-58C constitute holding circuits 59A-59C, respectively. Transfer contacts 60A-60C are closed in succession. Shown at numeral 61 is an A/D converter.

Figure 4:
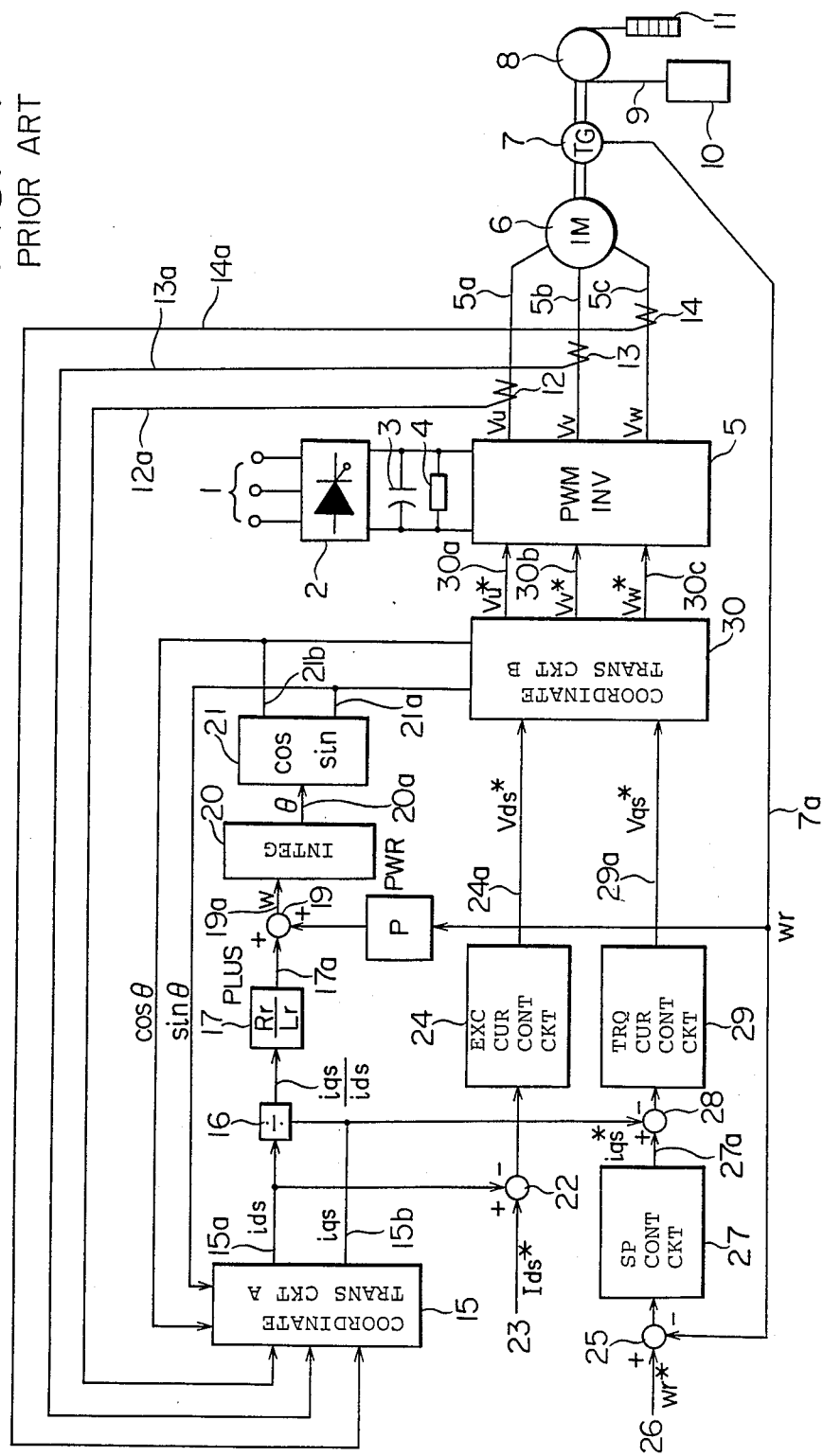
FIG. 4 is an arrangement diagram showing a prior-art speed control apparatus for an A.C. elevator.

In the speed control apparatus for the A.C. elevator constructed as described above, the current feedback signals 12a-14a are fed into the microcomputer 41 through the input circuit 45, the speed signal 7a is fed thereinto through the input circuit 47, and the speed command value 26 is fed thereinto through the input circuit 46. The CPU 42 executes the calculating operations explained in regard to FIG. 4 in accordance with a program stored in the ROM 44, and the results are delivered as the primary voltage command values 30a-30c through the output circuit 48.

The operation of the embodiment will be detailed by taking the current feedback signal 12a as an example. This signal 12a is integrated by the integration circuit 54A. When the contact 55A is closed at the falling edge of the reset signal, charges stored in the capacitor 53A are discharged, so that the output of the integration circuit 54A becomes a saw-tooth wave as shown in FIG. 3(c). The contact 56A is closed at the rising edge of the reset signal. As shown in FIG. 3(d), therefore, the output of the holding circuit 59A is held at the output of the integration circuit 54A immediately before the contact 56A is opened, and the ripple component having been contained in the current feedback signal 12a is eliminated. The current feedback signals 13a and 14a are quite similar. The transfer contacts 60A-60C are successively changed-over after the completion of the holding operations of the holding circuits 59A-59C. Thus, the outputs of the holding circuits 59A-59C are successively sent to the A/D converter 61 and converted into digital values.

As described above, this invention disposes integration circuits which integrate the outputs of current detectors for detecting the primary currents of an induction motor and which are reset at fixed periods, and holding circuits which hold the outputs of the integration circuits for a predetermined time. This produces the effects that the influence of the ripples of the currents attributed to the pulse width modulation can be eliminated, and that the overall circuit can be arranged inexpensively.

What is claimed is:

1. A speed control apparatus for an A.C. elevator, comprising:
   an inverter which inverts D.C. power into A.C. power of variable voltage and variable frequency,
   a cage driving motor which is supplied with the A.C. power from said inverter and which drives a cage of the elevator,
   a speed detector which detects a speed of said motor,
   a current detector which detects a primary current of said motor,
   an integration circuit which integrates an output of said current detector and which is reset at every fixed period,
   a holding circuit which holds an output of said integration circuit for a predetermined time, and
   control means for controlling the primary current and a frequency of said motor with an output of said speed detector and an output of said holding circuit, thereby to control said inverter so as to control a torque current and an exciting current of said motor independently of each other.

2. A speed control apparatus for an A.C. elevator as defined in claim 1, wherein said motor is a three-phase induction motor.

3. A speed control apparatus for an A.C. elevator as defined in claim 1, wherein said inverter is an inverter of pulse width modulation system.

4. A speed control apparatus for an A.C. elevator as defined in claim 1, wherein said current detector is a current transformer.

5. A speed control apparatus for an A.C. elevator as defined in claim 1, wherein said integration circuit is a parallel circuit which consists of an operational amplifier and a capacitor.

6. A speed control apparatus for an A.C. elevator as defined in claim 1, wherein said holding circuit is configured of a capacitor and an operational amplifier.

7. A speed control apparatus for an A.C. elevator as defined in claim 1, wherein said control means, said integration circuit and said holding circuit are configured of a microcomputer.

8. A speed control apparatus for an A.C. elevator as defined in claim 7, wherein said control means receives an input obtained by subjecting the output of said holding circuit to analog-to-digital conversion by an analog-to-digital converter.

9. A speed control apparatus for an A.C. elevator as defined in claim 8, wherein the single analog-to-digital converter is comprised, and it delivers the held outputs of three respective phases to said control means by changing-over them in succession.

10. A speed control apparatus for an A.C. elevator as defined in claim 7, wherein said control means includes input means for converting a speed command value into a digital value and delivering the digital value.

11. A speed control apparatus for an A.C. elevator as defined in claim 7, wherein said control means includes input means for converting the output of said speed detector into a digital value and delivering the digital value.

* * * * *